United States Patent [19]
Schmuck et al.

[11] Patent Number: 5,999,976
[45] Date of Patent: Dec. 7, 1999

[54] PARALLEL FILE SYSTEM AND METHOD WITH BYTE RANGE API LOCKING

[75] Inventors: Frank B. Schmuck, Campbell, Calif.; Boaz Shmueli, Haifa, Israel; James Christopher Wyllie, Monte Sereno, Calif.; Anthony J. Zlotek, Pleasant Valley; William A. Kish, Millerton, both of N.Y.

[73] Assignee: International Business Machines Corporation, Armonk, N.Y.

[21] Appl. No.: 08/893,633

[22] Filed: Jul. 11, 1997

[51] Int. Cl.[6] .................... G06F 15/163; G06F 17/30; G06F 13/14
[52] U.S. Cl. ......................... 709/226; 707/8; 710/200
[58] Field of Search .................. 395/200.56, 726; 707/8, 10; 711/150; 709/226; 710/200

[56] References Cited

U.S. PATENT DOCUMENTS

| | | |
|---|---|---|
| 4,274,139 | 6/1981 | Hodgkinson et al. . |
| 5,043,876 | 8/1991 | Terry . |
| 5,175,851 | 12/1992 | Johnson et al. ............................. 707/8 |
| 5,202,971 | 4/1993 | Henson et al. . |
| 5,226,159 | 7/1993 | Henson et al. . |
| 5,285,528 | 2/1994 | Hart ........................................ 395/726 |
| 5,454,108 | 9/1995 | Devarakonda et al. ................. 395/674 |
| 5,463,736 | 10/1995 | Elko et al. . |
| 5,490,270 | 2/1996 | Devarakonda et al. . |
| 5,535,375 | 7/1996 | Eshel et al. ............................. 395/500 |
| 5,566,297 | 10/1996 | Devarakonda et al. . |
| 5,634,122 | 5/1997 | Loucks et al. ............................... 707/8 |
| 5,668,958 | 9/1997 | Bendert et al. ......................... 395/308 |
| 5,761,659 | 6/1998 | Bertoni ........................................ 707/8 |
| 5,832,484 | 11/1998 | Sankaran et al. ........................... 707/8 |
| 5,835,766 | 11/1998 | Iba et al. .................................. 411/291 |
| 5,852,747 | 12/1998 | Bennett et al. ........................... 710/40 |
| 5,881,229 | 3/1999 | Singh et al. ............................. 709/203 |
| 5,884,308 | 3/1999 | Foulston ...................................... 707/8 |
| 5,890,153 | 3/1999 | Fukuda et al. .............................. 707/8 |
| 5,893,086 | 4/1999 | Schmuck et al. ........................... 707/1 |

OTHER PUBLICATIONS

"Method for Deadlock Prevention for Callbacks in a Distributed Environment," IBM TDB, vol. 38, No. 12, pp. 67–70, Dec. 1995.

"Establishing Distributed File System Access to MVS Host Files," IBM TDB, vol. 38, No. 4, pp. 39–40, Apr. 1995.

"Method for Protecting Request Atomicity in Multi–Writer Distributed Environment," IBM TDB, vol. 38, No. 12, pp. 227–228, Dec. 1995.

"CMS Interactive File Sharing Prototype", by Eshel et al., IBM Research Division, T.J. Watson Research Center, Yorktown Heights, NY, RC13371 (#50869) Dec. 18, 1987.

"IBM VideoCharger Server for AIX", International Business Machines Corporation, Mar. 1997.

Primary Examiner—Zarni Maung
Assistant Examiner—Andrew Caldwell
Attorney, Agent, or Firm—Lane, Aitken & McCann; Lynn L. Augspurger

[57] ABSTRACT

A computer system having a shared disk file system running on multiple computers each having their own instance of an operating system and being coupled for parallel data sharing access to files residing on network attached shared disks. Access to a file by a processor node is controlled by tokens transferred to the node from a token manager. To prevent another processor node from removing a token after the token has been received, but before it performs the operation on the file, each process can lock the token after it has been received. A node with a token can lock a byte range of a file, which byte range may include all or only some of byte range cornered by the token.

6 Claims, 2 Drawing Sheets

PARALLEL FILE SYSTEM AND METHOD WITH BYTE RANGE API LOCKING

FIELD OF THE INVENTION

This invention is related to computers and computer systems, and in particular to a file system running on multiple computers each having their own instance of an operating system and being coupled for data sharing with network attached shared disks, a shared disk file system. The specification of this application includes material which is also included in U.S. Pat. No. 5,893,086, which is assigned to the assignee of this invention, and which is incorporated herein by reference in its entirety so that certain portions of the originally submitted specification in this application which are also included in U.S. Pat. No. 5,893,086 have been deleted.

GLOSSARY OF TERMS

While dictionary meanings are also implied by certain terms used here, the following glossary of some terms which relate to our invention may prove to be useful:

Data/ File system Data: These are arbitrary strings of bits which have meaning only in the context of a specific application.

File: A named string of bits which can be accessed by a computer application. A file has certain standard attributes such as a length, a modification time and a time of last access.

Metadata: These are the control structures created by the file system software to describe the structure of a file and the use of the disks which contain the file system. Specific types of metadata which apply to file systems of this type are:

Directories: these are control structures which associate a name with a set of data represented by an inode An inode contains the attributes of the file plus a series of pointers to areas of disk which contain the data which makes up this file. An inode may be supplemented by indirect blocks which supplement the inode with additional pointers if the file is large.

Allocation maps: these are control structures which indicate whether specific areas of the disk (or other control structures such as inodes) are in use or available. This allows software to effectively assign available blocks and inodes to new files.

Logs: This is a set of records used to keep the other types of metadata in sync in the case of failures. It contains single records which describe related updates to multiple structures.

File system: A software component which manages a defined set of disks providing access to data in ways prescribed by the set of Xopen and POSIX standards related to file data. The term is also used to describe the set of data and metadata contained within a specific set of disks.

Shared disk file system: A file system where multiple computers share in the management of a file system without assigning total management to a single entity. All of the computers are peers in that any may perform any role required to manage the data. Specific roles may be assigned to specific computers as needed.

Shared disk attachment: This is a method of attaching disks to multiple computers with a protocol that makes the disks appear to be locally attached to each file system. The exact attachment protocol to each computer is not important to this work; but includes various forms of network attached disks, switched disk attachment or store and forward attachment. The key items are that it appears local to the file system and appears the same to all instances of the file system.

Quota: This is a function by which a file system limits the usage of a specific user or named group of users within the file system. For example; the administrator may limit user "john" to 100 megabytes of data within the file system. Quota is the function name used in the Unix (TM of S.C.O.) environment.

Access Control List: This is a file system technique by which a user can limit access to data to user who are named in a specific list.

BACKGROUND OF THE INVENTIONS

There is a need to supply file services to computers, such as a MPP machine and other clusters of computers which form part of a network of attached computers which serve as a common computing resource.

We now have certain "open" (e.g. Xopen and POSIX) standards related to file data to a shared disk file system where computing jobs which will execute on various computers require access to the same file data as if the data was local to the computer executing the job (in order to run systems developed by IBM for different systems, see e.g. U.S. Pat. Nos. 4,274,139 and 5,202,971 and 5,226,159). When multiple computers are part of a network, and multiple disks are part of the network, there is a need to create a shared disk file system which is compatible with the standards and yet requires no change in multiple instances of operating systems running on the computers, whether they be MMPs or clusters.

Shared File System (SFS) (See U.S. Pat. No. 5,043,876) is a term applied to IBM's S/390 systems which operate under IBM's VM for sharing data among virtual machines. Shared file systems also have been known as data sharing vehicles, such as IBM's IMS and GRS, where developed for a single-system environment, and under MVS GRS was used in a cluster of systems sharing disk storage, and GRS in such a system could allocate small lock files on shared disk in order to serialize access to data sets. MVS must serialize access to the table of contents on disks or to the catalog, so whatever RESERVES operations are needed for the operating system to perform. This causes a good deal of system overhead.

IBM's DB2 has been adapted for data sharing in a Multiple Virtual Storage (MVS)/Enterprise Systems Architectures (ESA) environment by using IBM's coupling facility to create multisystem data sharing which requires a System/390 Parallel Sysplex environment because the coupling facility is needed to deliver highly efficient and scalable data sharing functions where the coupling facility manages connections between processors with a message path mechanism as outlined in U.S. Pat. No. 5,463,736, essentially becoming the super-single server for the shared data.

Represented by what may be the best of breed for Audio/ Video file systems (IBM's VideoCharger Server for AIX), previous solutions dealing with computer systems which would allow standards compliance have relied on shipping file system level requests to a single server which acquires the data and returns it or shipping metadata requests from a client to a single server which allows the original computer to directly fetch the data. IBM also provides what is called the Virtual Shared Disk (VSD) program product which allows an SP2 user to configure nodes as primary and secondary IBM VSD server nodes. VSD software allows multiple nodes, running independent images of the operating system, to access a disk device physically attached only to one of the nodes as if the disk device were attached to all nodes, which IBM has implemented four the AIX operating system with a transparent switchover to a secondary server node when the primary server node for a set of virtual shared disks fail. In both cases, the existence of the single server is both a bottleneck and a potential failure point, even though there have been substantial advances made with such single server systems, like IBM's VideoCharger, as illustrated by U.S. Pat. No. 5,454,108's lock manager, U.S. Pat. Nos. 5,490,270 and 5,566,297's cluster arrangement. Also, as in International Business Machines' systems, there also exist capabilities for partitioning a disk accessed via a network so that a given computer manages and accesses a specific region of the shared disk and does not use the regions assigned to other computer(s).

However, these systems, in the past have not provided any satisfactory solution permitting many computers which have a network access to multiple disks to permit any computer to have access to any data at any time, especially those which do not require a change in an operating system or standard, as we have developed and will describe in the context of our shared disk file system. Nevertheless we must recognize the work done by the inventors of the U.S. Pat. No. 5,454,108 for their advances for we have been able to use a modification of their lock manager as our advanced token manager in our own shared disk file system.

SUMMARY OF THE INVENTION

Our invention provides a shared disk file system where a file system instance on each machine has identical access to all of the disks coupled to and forming a part in the file system. This can occur using a gateway processor, a switched network, a high speed intranet coupling as would support TCP/IP, a non-uniform memory access bus couplings or other similar connections. In accordance with our invention, the shared disk file system supports disk read and write calls with associated management calls. The operating instance is a commonly available or standard and does not need to be changed to use our shared disk file system. We have provided new services needed to make our shared disk file system operate in a useful fashion.

Our shared file system operates as a parallel file system in a shared disk environment. We have provided a scalable directory service for the system with a stable cursor. We have provided a segmented allocation map. For our scalable parallel file system we have made dynamic prefetch a reality. Speed in our scalable parallel file system has been improved by improving cache performance and space utilization. In addition, extended file attributes support access control lists, known as ACL's in the Unix world, which are for the first time operable in a parallel file system which is scalable in a shared disk environment.

The improvements which we have made achieve efficient basic file control in a shared disk environment for multiple computers sharing the disk and file environment. The directory service claims provide efficient insertion and deletion of files into data structures without major disruption to the data structures. This is critical in parallel systems where exclusive control must be obtained of regions to be modified.

Our allocation map development provides the ability to allocate storage from the same pool of disks in parallel while maintaining full consistency of the metadata. This is important because each of the computers with access to the file system will wish to create additional data without regard to what is going on in the other computers. Our prefetch algorithms calculate the available I/O bandwidth and the application needs for data to determine the amount of data to prefetch. This is important in parallel systems where the demand for I/O can exceed the available bandwidth. Our cache performance developments balance pools of multiple accesses and while not related to parallel processing, it is a general file system improvement. The use of file attributes as a supporting mechanism is also applicable to non-parallel file systems; but within our overall parallel file system mechanisms it is very important because it allows an effective implementation of Access Control Lists in a parallel file system.

Allowing parallel update on the same file or directory in a shared disk environment is provided. We provide a metadata node for managing file metadata for parallel read and write actions. For our system, tokens are used for metadata node selection and identification, and we have enhanced token modes for controlling file size, as well as smart caching of byte range tokens using file access patterns and a byte range lock algorithm using a byte range token interface.

Parallel file updates required advances which revolve around the problem of how to effectively create and update metadata while updating the same file from multiple computers. One of our solutions is the creation of a metadata node which handles the merging of certain changeable metadata consistently from multiple originating computer applications. The second solution provides a locking scheme to effectively identify the computer to all which require its services. This avoids the need to create a fixed management point which might be a bottleneck.

Now, file size is a type of metadata which changes frequently in a parallel update situation. We have provided a method of getting the correct file size "just in time" when the executing application requires it. In addition we have redefined locking techniques for reducing the overhead of the token manager in this environment.

We have provided for file system recovery if a computer participating in the management of shared disks becomes unavailable, as may occur for many reasons, including system failure. We have provided a parallel file system recovery model and synchronous and asynchronous takeover of a metadata node.

Our parallel shared disk file system enables assignment of control of certain resources temporarily to a specific computer for modification. While this is the case, structures on the disk that are visible to other computers may be in a inconsistent state and must be corrected in the case of a failure. In order to handle this we have provided a method for extending standard logging and lock recovery to allow this recovery to occur while other computers continue to access most of the data on the file system. We have also provided for the handling of the failure of the metadata node. This development involves correction of metadata which was under modification and a new computer becoming the metadata node for that file, as described below.

Now, in the UNIX world the Quota concept is well known by that name. It is a generic concept able to be used to manage the initial extent of a space, and this concept is used with other operating systems, such as those of S/390 systems. Generically, when we consider quotas, they need to be managed aggressively, so that locks are not constantly required to allocate new blocks on behalf of a user. We have provided recoverable local shares for Quota Management, as described below.

As a quota is a limit on the amount of disk that can be used by a user or group of users, in order to use the concept in our parallel file system we have created a way for local shares to be distributed by a quota manager (which accesses the single quota file) for parallel allocation. This is crucial for those cases where a user has multiple application instances running on different computers sharing a file system. Our development provides for immediate recovery in many situations where sufficient quota exists at the time of the failure. In certain cases, running a utility like the UNIX standard utility called "quotacheck" is required to complete the recovery. We have also developed a technique for running a quotacheck utility at the same time as applications using quatas with minimal interference.

These and other improvements are set forth in the following detailed description. For a better understanding of the invention with advantages and features, refer to the description and to the drawing.

DRAWING

DETAILED DESCRIPTION OF THE INVENTION

Figure 1:
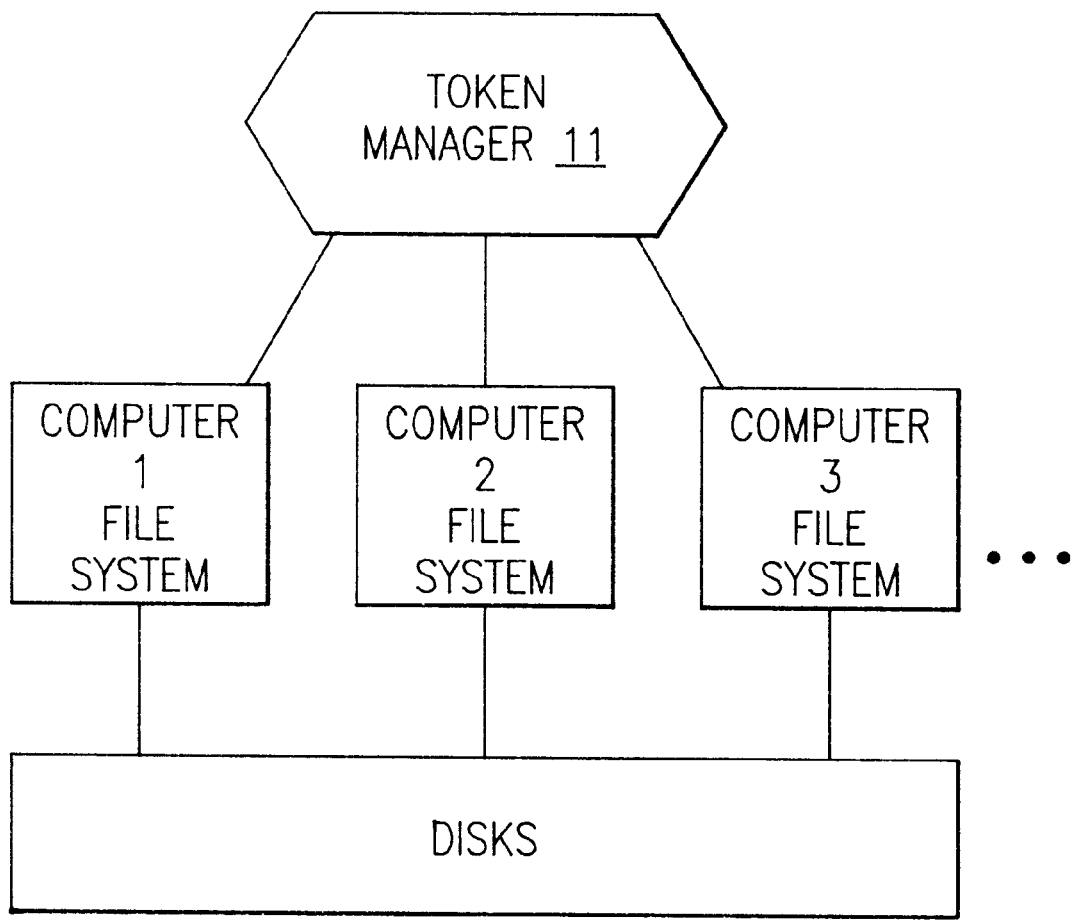
FIG. 1 illustrates a shared file disk system in accordance with our invention which includes a token manager for nodes of the computer system.

An example of our preferred embodiment of our shared disk file system implementation of several relevant components is illustrated by FIG. 1. Our system, as illustrated in FIG. 1, includes a token manager 11 which provides locking facilities for the computers which are considered nodes 1, 2, and 3 participating in the management of a file system. (N.B. For our token manager, we had to modify the lock manager of U.S. Pat. No. 5,454,108.)

Our file system code manages reads and writes requested by applications. This management uses the application requests and the commonly managed metadata to create and access data within the file system. This function is the bulk of the processing and is identical on all computers. With proper tokens, this processing directly accesses the disk through the disk read, write and control functions.

The shared disk implementation shown in FIG. 1 and described in general above provides several major advantages over previous parallel and cluster file systems. It provides the shortest available path for moving the data from the disk to/from the using application. There is no file system server in the path for either data or metadata. Any available path can be used avoiding a server as a bottleneck or as a single point of failure. Since the required central functions in the lock manager have no attachment to a specific computer, they can be migrated from computer to computer to satisfy performance and availability needs.

In order to create the system we are describing, as we have noted, U.S. Pat. No. 5,454,108 showed a lock manager that we had modify to be able to handle different recovery paradigms needed for shared disk file systems and also to add additional lock states needed for the metanode processing required to allow parallel update of the same file. These specifics along with others are amplified below in the various subsections of this detailed description.

Metadata Node Operation

This section describes the operation of the metadata node which improves performance in those cases where multiple computers need to update or enlarge the same data object. We start with the creation of a metanode for these functions and continue in describing methods of identifying the metadata node and recovering it.

Usage of a Metadata Node

PO997065-po8970072

This first section about our metadata node describes generally what our metadata node is and what problem it solves. A metadata node is used in our system for managing file metadata for parallel read and write in the shared-disk environment. The parallel file system makes it possible for any and all disks which make up the file system to independently capability, a file should be shared by multiple processors for both reading and writing.

There are several problems which can greatly reduce the performance of such access. Although nodes may read and write to different areas of the file if they present an appropriate lock on the sections which they are reading or writing, they all need to access the same metadata. The metadata includes the file size, the file access and modification times, and the addresses of the file's data blocks. For example, all operations that read and write the file need to know if they exceed the file size, and update it if they extend the file. Such a single point of interest might present a serious bottle neck if true parallel write sharing to a file is needed.

We have implemented a system which allows each node to act as independently as possible when reading and writing the same files, and devised a mechanism to synchronize these operations so that a consistent view of the file will be available from all nodes by providing our method for managing metadata information. Our method for the management of metadata information for a file in a shared-disk file system provides that, for each file, a single node is selected as the metadata-node (or metanode) for that file. The metanode is responsible for handling all the I/O activity of the metadata from and to the disk (or disks) on which the metadata reside.

All the other nodes communicate with the metadata node in order to fetch or update metadata information. However, these nodes do not access the metadata information on the disk directly.

The metadata node is elected to be the first node that accesses the file. Thus, if only one node needs to access the file, no extra overhead is incurred since the node can access the metadata directly. Additional nodes will access the metanode for metadata.

The introduction of a metanode prevents a considerable amount of disk activity, which presents a considerable performance improvement for a parallel file system with a fast communications switch.

The metanode keeps a cached copy of the metadata which reflects the metadata on disk. Other nodes also keep a cached copy of the metadata which they read in the past from the metanode, and which they augmented as needed (for example, changed the access time).

Each metadata element (access time, modification time, file size, data block disk addresses) has its own pattern of usage and special characteristics. For example, our system does not require a very precise access time, but one which is correct within five minutes. Thus, updates to the metanode do not need to be frequent, and thus a considerable amount of communication is saved.

Also, the file size does not to be exact on all nodes, as long as the system behaves consistently. Using a sophisticated way to control the file size on all nodes allows a parallel write scheme where multiple nodes may extend the file concurrently.

A great amount of disk access is saved by using a deferred sync algorithm. A sync daemon is a piece of software that runs as part of the operating system of each node. The sync daemon tries to flush dirty data and metadata to disk every N seconds. If M nodes write the file in parallel, this means M disk accesses every N seconds for the metadata only. With parallel write, all nodes send their updated metadata to the metanode, which flushes the file every N seconds when it gets a signal from the sync daemon.

Every node would access the disk in order to read or write metadata.

Using Tokens po997072-po8970066

The second of the parallel write sections of this description relates to our use of lock modes for finding the metadata manager node. Tokens using lock modes of finding the metadata manager node are used for metadata node selection and identification in our parallel file system where all disks which make up the file system can independently be accessed by multiple processors. To exploit this capability, a file should be shared by multiple processors for both reading and writing.

In this system, a node is appointed for each file which is responsible for accessing and updating the file's metadata. This metadata node (or metanode) shares this information with other nodes upon request.

The metadata node keeps the information about the file's metadata and acts as a smart cache between the disk and all the nodes that access the file. There are situations when the metadata node (or metanode) ceases to serve this function. In order to enable smooth operation and recovery, these situations need to be handled. Nodes that used to access the metanode need to elect a new metanode in a straightforward way.

We elect metanode and make this information available to all nodes. The election process takes into account the access patterns of the file. There should be one, and only one, metanode per file. Also, the scheme should and does allow metanode takeover and recovery. In our system metanodes are selected and their information is known to other nodes.

We use a token manager subsystem. A token manager is a distributed subsystem which grants tokens to nodes. Every node can ask for a named token with a specific mode. The token manager grants the token to the node if the mode does not conflict with tokens with the same name which were granted to other nodes. For each token there is a list of the possible modes and a conflict table. If the requested token conflicts with a token which was granted to another node, a revoke is done and the conflicting node downgrades its token mode to a mode which does not conflict with the requested mode.

The metadata node is elected to be the first node that accesses the file. Thus, if only one node needs to access the file, no messages are extra overhead is needed since the node can access the metadata directly. Additional nodes will access the metanode for metadata.

For each file, we define the "metanode token". There are three modes for the metanode token: "ro" (read-only), "ww" (weak-write) and "xw" (exclusive-write). The rules are: "xw" token conflicts with all modes. "ww" conflicts with "xw" and itself. "ro" conflicts with "xw" only. Thus, there are two possibilities: either 0 or more nodes hold the token in "ro", and then at most one node can hold the token in "ww", or a single node holds the token in "xw". The Token Manager subsystem (or TM for short) is responsible for managing tokens for a node and making sure the token modes are consistent with this definition. The conflicts between the different modes can be summarized in the following table 5:

TABLE 5

|    | ro | ww | xw |
|----|----|----|----|
| ro |    |    | ** |
| ww |    | ** | ** |
| xw | ** | ** | ** |

For the metanode, we devised the following algorithm: when a node opens a file for the first time, it tries to acquire the metanode token in mode "ww". The token manager TM grants the token in "ww" if it can, i.e., if no other node holds the token in "ww" or "xw". If this happens, the node becomes the metanode manager However, if another node holds the token in "ww", then the TM grants the token in "ro". Then the node knows that another node is the metanode. It can query the TM find out who the metanode for this file is.

There are situations when a node must become a metanode. In this case, asking for a "ww" token will not help since the old metanode will not downgrade its token. Here the node that wishes to become the metanode asks for an "xw" token. This will cause a revoke message to be sent to the existing metanode. The old metanode will then downgrade its token to "ro" and the TM will return a "ww" token to the new metanode. If a node asks for an "xw" token and no other nodes hold this token at all, then TM will grant the token in that mode.

If a node holds the token in "xw", then it is the metanode for this file, but in addition, no other node has this file open. In this case, if a node tries to acquire the token in "ww", a revoke message is sent to the metanode. As a result, the node downgrades its "xw" token to "ww", and the TM is thus able to grant a "ro" token to the new node.

Using Enhanced Token Modes for Controlling the File Size

PO997074-po8970068

The relevant file system standards require that the correct file size be available on demand; however the maintenance of file size in parallel at all nodes in the presence of multiple applications appending data to the file is complicated and costly in terms of performance. The next of this series of features describes our way of maintaining file size so it is available when needed without constant overhead. In doing so a parallel file system where all disks that make up the file system can independently be accessed by multiple processors can be exploited with a file shared by multiple processors for both reading and writing without a constant overhead.

Read & write sharing of files involve accessing the file's size. Every read and write needs to check if the operation's offset is beyond the current file size, and return an EOF (end-of-file) if it is. Every write needs to check if the operation's offset is beyond the current EOF, and if it is, it should extend it. When there are several readers and writers, all this has to be consistent. Thus, if one node writes at offset 1000, a read by any node at that location should not return an EOF.

One way of keeping a consistent state is to serialize the accesses to the file's size. This, however, will present a major bottleneck for parallel writers, since each write (and read) will need to get the current file size before each operation.

In our preferred embodiment we keep a local copy of the file size within each node. Also, together with each copy, a lock mode is kept. A lock manager assures that lock modes that conflict do not co-exist. An appropriate lock mode for each read and write operation assures that the locally cached file size is accurate enough for a correct result of this operation. The different modes are:

"rw" for operations that Read and Write within the locally cached file size

"rf" for operations that Read beyond the locally cached File size

"wf" for operations that Write beyond the locally cached File size

"wa" for Write operations that Append to the file

"xw" for operations that reduce the file size (like truncate), and thus need an exclusive Write lock.

The conflict table of the file size's lock modes is:

TABLE 6

|    | rw | rf | wf | wa | xw |
|----|----|----|----|----|----|
| rw |    |    |    |    | ** |
| rf |    |    | ** | ** | ** |
| wf |    | ** |    | ** | ** |
| wa |    | ** | ** | ** | ** |
| xw | ** | ** | ** | ** | ** |

Whenever a node upgrades its lock mode, it reads the new file size from a special node that keeps track of the file size (the metadata node, or metanode for short). Whenever a node downgrades its lock mode, it sends its file size to the metanode. The metanode itself keeps a file size which is a maximum of all the file sizes that it received (except when a node locks the file size in the "xw" mode, which allows reducing the file size).

Some modes only allow reading the file size (rw rf). Some modes (wf, wa) allow increasing the file size. One mode (xw) allows to decrease the file size. The true file size is the maximum of all the local copies of the file sizes that the nodes hold.

Operations that read or write within the locally cached copy of the file size, need an "rw" lock on the file size. Operations the read beyond the locally cached copy of the file size, need to ensure that the file size did not increase since they last read the file size. Thus, they need to acquire an "rf" lock (which conflicts with modes that increase the file size).

Operations that increase the file size acquire either a "wf" or "wa" lock. A "wf" lock is needed if the writer knows the new absolute file size. A "wa" lock is needed for APPEND operations. An APPEND operation writes at the current EOF. Thus, several APPEND operation will write one at the end of the other. Thus, "wa" conflicts with itself since one APPEND operation should wait for other APPEND operations.

The only mode that allows decreasing the file size is "xw". This is an exclusive mode which will cause all other nodes to relinquish their locks and thus lose the locally cached file size. Thus, after the node that acquired the "xw" finishes its operation (for example, a file truncate), all the nodes will have to get the new file size from the metanode.

We are not aware of a system where different file sizes are cached at different nodes so that parallel write sharing of the file is maximized, and yet the system presents a consistent view of the file for all users.

The solution allows users on different nodes to extend the file and thus to achieve a very high degree of write sharing. Write operations do not need to be serialized even if the users extend the file size.

Smart Caching of Byte Range Tokens Using File Access Patterns

PO997063-po8970070

The next of our parallel write developments addresses the locking used for all accesses; parallel and non-parallel. Locking only the portion of the file that is required immediately is expensive and would require calls to the lock manager with every application call. This algorithm attempts to anticipate the requirements of the application considering what else is going on in the system and to minimize the number of token manager calls.

For parallel reading and writing to the same file, in order to serialize accesses to the same regions in a file, a distributed lock mechanism is used. However, getting such a lock usually requires that a token will be acquired first, and this is considered an expensive operation. Thus, it would be beneficial to cache tokens at a node by anticipating the access patterns of the file. On the other hand, acquiring a token that is not needed might reduce performance since this token would be needed by another node. This disclosure describes the algorithm by which a node acquires a token so as to maximize performance by anticipating the file's access patterns.

Serializing accesses to different regions in a file to which processes on different nodes write in parallel is done by distributed byte range locks. When a process needs to lock a byte range, it first needs to acquire an appropriate byte range token. The byte range token represents the node's access rights to a portion of a file. Thus, if a node holds a byte range token for file X for range (100, 200) in read mode, it means that the node may safely read that portion of the file. However, to prevent stealing the token, the node must lock the token before the actual read, since if another node needs to write the same portion, it might steal the token. Locking the token prevents the steal. After the read has completed, the token is unlocked.

One can view tokens as a way of "caching" locks. When a node needs to lock a portion of a file, it needs to lock the token. At first, it will acquire a token and lock it. Once the operation is finished and the token is unlocked, it is still resident at the node. Thus, subsequent operations on the same region would not need to access the token authority. Only when the token is stolen will a new request for the token be needed.

Given this, it may be of benefit to request a larger token than needed to be locked. For example, if a process reads a file sequentially, and it reads from range 1000 to 2000, then although the next lock will be of range 1000 to 2000, it can request a larger token, for example, from 1000 to 10000. However, this may create excessive token traffic on other nodes. If another node is in the process of writing from 5000 to 6000, the token acquisition may delay the operation.

The idea is to give two ranges when acquiring a byte range token: a required range (which is the minimum range that is needed for the operation) and the desired range (which is the maximum range that is expected to be of any use). The token manager is guaranteed to grant a token that covers the required range but is not larger than the desired range.

Two algorithms need to be specified: (1) how to compute the desired and required range for each operation; this is on the requesting side; (2) how to compute the granted range; this is on nodes which hold conflicting tokens.

For the above algorithms, we differentiate between two file access patterns: random and sequential. With random accesses, the starting offset of the next operation cannot be predicted. Sequential operations are assumed to start where the previous operation finished. Each file may be open multiple times on each node, and each such instance may present a different access pattern.

We prefer the following algorithm. The main goal is to minimize token traffic.

When trying to lock a byte range, we first query the token manager and see if a compatible token exists on the node. The range that is probed is the minimum range that is required by the operation. If the token is available locally, it is locked and no further token activity takes place.

However, if the token is not available, then a token is requested. The required range is computed based on the offset and length of the file operation. The desired range is based of the access pattern of the file. If the file is accessed randomly, then the desired range will be equal to the required range, since there is probably no advantage in stealing tokens (that would probably not be needed) from other nodes. If, however, the file is accessed sequentially, the desired range starts from the required range's start, but ends at infinity (there's a special value to represent infinity). This is in attempt to minimize future token requests, since we can predict the future locks that will be needed.

When a node holds a token that conflicts with a request for a token on another node, it gets a revoke request. The request contains the requesting node's required and desired ranges. Here, the node has to make a decision what range it can relinquish. If the required range is equal to the desired range, the decision is easy, and the granted range is the required (and desired) range. However, if the desired range is different than the required range, that means that the requesting node is accessing the file sequentially, and it wishes to have a token that starts at the required range's start but ends at infinity. The node then makes a pass over all its active processes that access the file, and checks whether they access the file sequentially or randomly. If all of them access the file randomly, then the node grants the desired range. However, if one or more of the processes access the file sequentially, it would be a waste to relinquish the desired range, since with high probability we know what token will be requested soon. In this case, the file pointers (i.e., the anticipated location of the next operation) of all the sequential operations are examined, and the minimum offset is calculated. It is anticipated that these operations will not access file regions which are below this minimum, since they are sequential. Thus, the granted range is stretched to that calculated minimum, if it is higher than the required range.

We are not aware of a system where byte range tokens are requested based on the file's access pattern.

The solution allows caching of tokens with regard to the file access pattern. This saves acquisition of tokens which is a costly operation and thus improves the overall performance of the system.

Any parallel processing system which has the need to allow parallel write sharing of files and needs to serialize accesses to the same regions in the file.

Byte Range Token Interface

PO997073-po8970067

Figure 2:
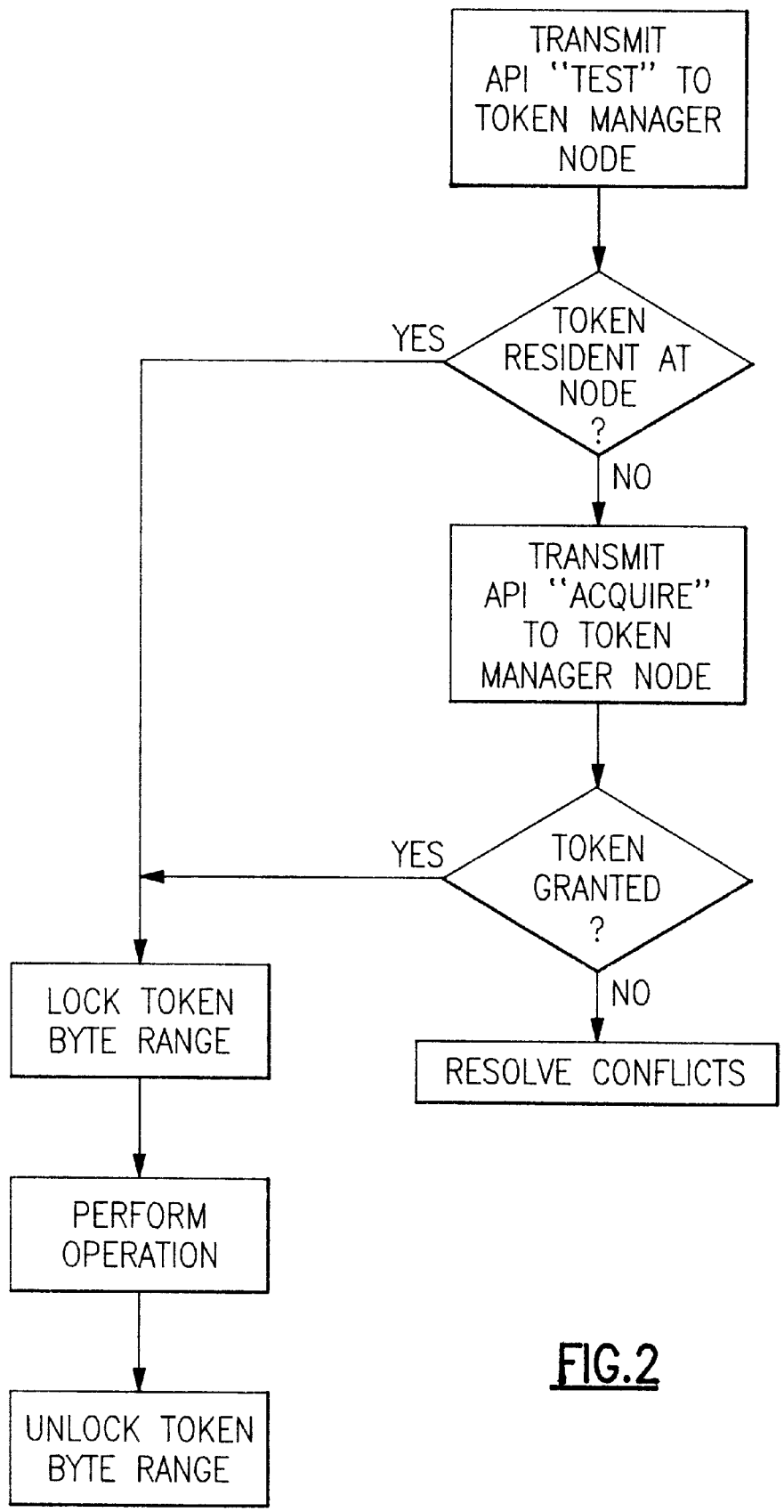
FIG. 2 is a flow chart illustrating the steps of the claimed invention.

Referring now to FIG. 2, this parallel write improvement provides for the management of information describing tokens using a byte range lock algorithm with a byte range token interface. Our parallel file system where all disks that make up the file system can independently be accessed by multiple processors when exploited requires that a file should be shared by multiple processors for both reading and writing. To enable parallel write operation while ensuring file consistency, a locking mechanism for regions in files is required. In a distributed environment, tokens are sometimes used. This token represents the access rights of a node to an object. However, a node might run several processes which try to access the same region of a file; thus, a local lock mechanism is needed on the tokens. In addition, another node might need to access the same region and thus may try to revoke the token from this node; thus, a revoke should not proceed as long as a local process locks the token. Thus, some kind of locking algorithms should be used for these tokens, which are managed by our Token Manager (TM), which is our improvement over U.S. Pat. No. 5,343,108 assigned to International Business Machines Corporation.

To get access to a region in a file, a node first has to get the appropriate token, then lock it, perform the operation, and unlock the token. There are several problems associated with locking the tokens; first, a token may already be cached in the node. In this case we do not need to acquire it again. Second, we must ensure that locks within the same node do not conflict; third, we must handle revoke requests from other nodes that need a token that conflicts with a token that we currently hold. Our locking algorithm presented here solves these problems efficiently.

Our locking algorithm is presented as a set of APIs. Two APIs are used for locking and unlocking a byte range. A third API is a callback function called by the Token Manager. The Token Manager is assumed to provide three APIs as well. One API is needed to acquire a byte range token ("Acquire"). A second API is needed to test whether a byte range token is already cached in the node ("Test"). A third API is needed when relinquishing a token as a response of a revoke ("Relinquish"). For the purpose of accessing regions in files, each token contains a range (start, end) of the region of the file which it can access.

We now elaborate on the Token Manager APIs which are an assumption. An acquire function of the form Acquire(byte_range)

which is called to acquire a range token
And a revoke callback function of the form Revoke(byte_range)

which the TM calls whenever another node needs that token. As a result, the node should call Relinquish(byte_range)

The algorithm that we implemented is also based on a fourth interface that has to be provided by the TM:

Test(byte_range)

which queries the TM for the existence of the token on the node.

To simplify the implementation, we do not keep track of the tokens that we hold; we leave that to the token manager, and we use the Test interface to query whether a token needs to be acquired. Usually, there are actions to be performed when a token is acquired. Thus, it is desirable to know if a token is already held so that these actions may be spared.

The algorithm is based on a lock table (Range lock table, or RLT), which holds all the existing locks. The table is protected by a mutex to enable atomic insertions and deletions of locks. Three main functions are exposed: LOCK, which locks a byte range; UNLOCK, which unlocks a previously locked range; and REVOKE, which handles a revoke request.

We present the pseudo code for these interfaces:

```
LOCK(range)
{
retry:
    old_revokes = nrevokes;
    if (not Test(byte_range)) {
        // the token does not exist on this node
        acquire_mutex;
        i_am_fetching = true;
        fetch_is_pending = true;
        release_mutex;
        Acquire(byte_range);
        get_data_associated_with byte_range;
        goto retry;
    } else {
        // we have the token locally - check that it was not stolen
        acquire_mutex;
        if (old_revokes != nrevokes)
            release_mutex;
            goto retry;
        }
        // make sure there are no pending acquires; if there are
        // make sure they are finished first
        if (not i_am_fetching) {
            if (fetch_is_pending) {
                sleep();
                goto retry;
            }
        }
        // if we acquired the token before the Test, we need to
        // release other threads we hold the mutex, so no revokes
        // can interfere here
        if i_am_fetching) {
            i_am_fetching = false;
            fetch_is_pending = false;
            wakeup();
        }
    }
    err = insert_range_into_lock_table;
    if (err == E_CONFLICT) {
        sleep(); // wait for someone to release the lock
        goto retry;
    }
exit:
    if (i_am_fetching) {
        fetch_is_pending = false;
        i_am_fetching = false;
    }
    release_mutex;
}
UNLOCK(range)
{
    acquire_mutex;
    delete_range_from_lock_table;
    wakeup;
    release_mutex;
}
REVOKE (range)
{
retry:
    acquire_mutex;
    err = insert_range_into_lock_table;
    if (err == E_CONFLICT) {
        sleep();
        goto retry;
    }
    nrevokes++;
    release_mutex;
    put_data_associated_with_byte_range;
    Relinquish(range);
    acquire_mutex;
    delete_range_from_lock_table;
    wakeup ;
    release_mutex;
}
```

We have thus described a byte range lock. While we are not aware of of any algorithms for byte range locks, we would note that previous solutions for non-byte range locks would keep a copy of the token states outside of the token manager.

Here we would remark that our distributed token manager provides interfaces (Acquire, Revoke, Relinquish, and Test) for the locking of ranges (i.e., byte ranges of a file). A given range can be requested in either shared-read or an exclusive-write mode.

One of the features of our invention is that we examine a token request for a specified byte range for comparing the request with the existing conflicting ranges in the entire multinode system and granting the largest possible byte range which does not require a toke revoke from another computer. This reduces the probability that the next operation on the requesting node would require another token request. Counters and non-blocking lock calls are used to acquire tokens while holding other locks. This technique allows more efficient serialization for multiple requests within a single node allowing the required multiple node serialization.

So we provide that the Acquire interface of the token manager takes as input a mode, as well as two ranges, a "required" range, and a "desired" range. The desired range must be a superset of the required range. An application calling the Acquire interface is guaranteed that, at a minimum, it will be granted the required range. The token manager will determine if any conflicting ranges (i.e., ranges that overlap the required range in a conflicting mode) have been granted to other nodes. If any conflicting ranges are found, then the token manager will request that each node that has a conflicting range downgrade the overlapping range to a non-conflicting mode.

We further provide that when any conflicts with the required range have been resolved, the Acquire interface will determine the largest, contiguous range which totally covers the required range, which is also a subset of the desired range; This is the range which the Acquire interface will return to the calling application. In effect, the token manager will grant the largest range possible (bounded by the desired range parameter) that does not require additional revoke processing to be preformed.

The Revoke interface of the token manager is used to communicate to an application information about a conflicting range request from another node. When an Acquire request detects conflicting ranges that have been granted to other nodes, it will request that the application running on each of conflicting nodes downgrade the ranges that they've been granted. The information passed through the Revoke interface includes the mode, as well as the required/desired ranges that were specified on the Acquire call.

Upon receipt of a revoke request, an application will invoke the Relinquish interface to downgrade any conflicting ranges it's been granted to a non-conflicting mode. At a minimum, the application is required to downgrade any ranges that conflict with the "required" range to a non-conflicting mode, but may downgrade a larger range if it desires.

The token manager also provides a Test interface that will determine if a given range has been granted to the local node. This can be used by an application to determine if an Acquire request for a given range will require a communication request to the token server node.

By processing with the use of sequence numbers for a given byte range we provide correct processing of acquires and revokes on the same byte ranges. The token manager Acquire interface takes as an argument, a sequence number. For each token, the token manager maintains a sequence number for each node that has been granted a range. The token manager updates the field containing a nodes sequence number at the completion of an Acquire operation, with the value specified in the Acquire interface. When a subsequent Acquire must revoke ranges from conflicting nodes, the token manager will pass the sequence number of the last successful acquire from that node via the token manager Revoke interface.

In view of the interfaces to the distributed token manager (Acquire, Revoke, Relinquish, Test), we have provided an improved method for implementing local byte range locks in the code used. Several potential complications are elegantly solved by these program methods or algorithms, while enabling some sophisticated features:

We process multiple token acquires and revokes in parallel using the locking techniques described below with the pseudo code in the original disclosure. We allow for several token acquires to be processed in parallel. This can happen, for example, if several file system operations try to access different sections of a file in parallel.

And we allow for a token revoke for one part of a file to happen concurrently with an acquire, as long as the two do not conflict.

It will be appreciated that we do not need to keep a copy of the local token state within the byte range lock code.

We eliminate a livelock situation where, just after it is acquired, but before it is locked, a token is revoked by another node. The other node acquires the token and before being locked, it is stolen again. This ping-pong effect stops progress.

Now, a result of our not needing to keep a copy of the local token state within the byte range lock code is a reduction of the memory needs of our program since this information is already stored in the TM. An API queries the TM to find out if the token is already cached. After locking the byte range, a special mechanism is provided to make sure that a revoke didn't happen after testing for token existance but before locking it. It is possible that the token was revoked in between. In this case, we acquire the token and try again.

The same byte range lock code that is used by the file system operations is also used by the revoke callback function. However, a special flag signified that this is a lock-for-revoke. This makes the code more compact and allows the use of the same lock tables.

The API for locking a byte range supports various options that enhance its operation:Non-blocking; Local-lock; Test; and Sequential. The non-blocking option allows for a non-blocking operation; if we don't have the token or a conflicting lock is being held, the lock code returns immediatly with an appropriate return code.

The local-lock option allows for a non-distributed operation; if we do not need to lock globally but only within the node, we can use this option.

The test option allows seeing if we could lock the byte range, but without really locking.

The sequential option provides a hint that we lock a byte range for a reading (or writing) a file that is accessed sequentially. This hint is used if a token is needed. In this case, a token that is larger that the one which is really needed is desired (but not required).

Special provisions are made for keeping track of the various locks that are held by the threads. A debugging utility dumps the existing byte range locks and the thread numbers that are holding them. Also, statistics are kept for understanding the patterns of file access and lock behaviour.

By returning a handle for each successful lock operation, an unlock operation is speedy and does not require a search or a lookup.

By keeping counters of the various existing lock modes, the operation which checks if a conflicting lock exists is fast. For example, if we keep a counter for the number of active shared-read locks, and active exclusive-write locks, we can often know if we need to check for range overlap. E.g., if there are no exclusive-write locks, and we need a shared-read lock, we know that there is no conflict and we just need to find an empty slot in the lock table.

The lock code provides support for an unlimited number of byte range lock requests. In case the lock table gets full, or a conflicting lock is requested, the thread that is asking for the look is put to sleep and is woken up when a lock is unlocked.

Our solution does not duplicate token information, and thus is compact and efficient.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. In a computer system having a shared disk file system for multiple files running on multiple computer nodes each having their own instance of an operating system and being coupled for parallel data sharing access to files residing on network attached shared disks, the method of managing access to shared files by the computer nodes, including the steps of:

responding to access requests from said computer nodes to a token manager node for access to a file including granting of an access token to the file specifying a byte range;

maintaining a record at said token manager node of access tokens granted to said computer nodes by said token manager node;

transmitting a test request from said computer node to said token manager node to test if a token with a required byte range is already granted and resident in the requesting computer node;

locking a byte range at a computer node where a token with said byte range is resident at a computer node, performing an operation on a file within said byte range, and unlocking said byte range upon completion of said operation.

2. In the system of claim 1, the method of managing access to shared files as in claim 1 including the following operation commands: "Acquire" for requesting a token with a byte range from the token manager node; "Revoke" to request a computer node to relinquish a token resident in that computer node; "Relinquish" for a computer node to give up a token in response to a "Revoke" request; and "Test" if a token with a required byte range is resident on a computer node.

3. In the system of claim 2, the method of managing access to shared files as in claim 1, wherein said operation commands and said locking and unlocking functions are performed via Application Program Interface (API) commands.

4. In the system of claim 1, the method of managing access to shared files as in claim 1, including examining a token request for a specified byte range, comparing the specified byte range with the existing conflicting ranges in the entire multinode system, and granting the largest possible byte range which does not require a token revoke from another computer node.

5. In the system of claim 1, the method of managing access to shared files as in claim 1, wherein sequence numbers are used for a given byte range for processing of acquires and revokes on the same byte ranges.

6. In the system of claim 2, the method of managing access to shared files as in claim 9, wherein counters and non-blocking lock calls are used to acquire tokens while holding other locks.

* * * * *